(12) United States Patent
Miura et al.

(10) Patent No.: US 8,130,447 B2
(45) Date of Patent: Mar. 6, 2012

(54) POLARIZATION ELEMENT

(75) Inventors: Michiyori Miura, Shinjuku-ku (JP);
Toshiaki Sonehara, Shinjuku-ku (JP);
Hideo Kobayashi, Shinjuku-ku (JP);
Mitsuhiro Kureishi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/882,267

(22) Filed: Sep. 15, 2010

(65) Prior Publication Data

US 2011/0002026 A1    Jan. 6, 2011

Related U.S. Application Data (63) Continuation of application No. PCT/JP2009/054997, filed on Mar. 16, 2009.

(30) Foreign Application Priority Data

Mar. 21, 2008    (JP) ................................. 2008-072964

(51) Int. Cl.
*G02B 5/30* (2006.01)

(52) U.S. Cl. ................................. 359/485.05
(58) Field of Classification Search ........................ None
See application file for complete search history.

(56) References Cited

U.S. PATENT DOCUMENTS

| 5,151,956 A * | 9/1992 | Bloemer ......................... 385/11 |
| 2006/0262398 A1* | 11/2006 | Sangu et al. .................. 359/486 |
| 2010/0328771 A1* | 12/2010 | Sonehara et al. ............. 359/487 |

FOREIGN PATENT DOCUMENTS

| JP | 5-208844 | 8/1993 |
| JP | 11-183727 | 7/1999 |
| JP | 2007-272016 | 10/2007 |

OTHER PUBLICATIONS

Kazutaka Baba and Mitsunobu Miyagi, "Anisotropic optical media from laminated island films: theory," J. Opt. Soc. Am. A 8, 619-624 (1991).*
U.S. Appl. No. 12/875,774, filed Sep. 3, 2010, Sonehara, et al.

* cited by examiner

*Primary Examiner* — Lee Fineman
(74) *Attorney, Agent, or Firm* — Oblon, Spivak, McClelland, Maier & Neustadt, L.L.P.

(57) ABSTRACT

A polarization element has a polarizer with an aggregate of metal pieces: Plasmon resonance frequency of a metal piece varies according to the polarization direction of a irradiated on it. In the polarization element, the plasmon resonance frequency in a predetermined direction of a metal piece is substantially equal to the frequency of light irradiated on the polarization element. The real part and the imaginary part of permittivity at the plasmon resonance frequency of a metal piece's constituent material and the refractive index (na) of a dielectric layer satisfy a particular relation.

20 Claims, 10 Drawing Sheets

POLARIZATION ELEMENT

CROSS REFERENCES TO RELATED APPLICATIONS

This application is a continuation application of International Application No. PCT/JP2009/054997, filed Mar. 16, 2009, the entire contents of which are incorporated herein by reference. PCT/JP2009/054997 claims priority to JP 2008-072964, filed Mar. 21, 2008.

TECHNICAL FIELD

The present invention relates to a polarization element, and particularly, to a polarization element using a difference in light absorption efficiency due to the shape anisotropy of metal fine particles.

BACKGROUND ART

A polarization element means an optical element having a function of transmitting a linearly polarized wave having an electric field vibration plane in a specific direction and preventing the transmission of a linearly polarized wave having an electric field vibration plane in a direction perpendicular to the specific direction (hereinafter, in the polarization element, the electric field vibration direction of transmission light is referred to as a "transmission axis" and a direction perpendicular to the transmission axis is referred to as an "extinction axis").

The characteristics of the polarization element are evaluated using loss (hereinafter, the loss is referred to as an "insertion loss") when a linearly polarized wave having an electric field vibration plane in a direction parallel to the transmission axis of the element passes through the polarization element and a value (hereinafter, the value is referred to as an "extinction ratio") obtained by dividing the intensity of the electric field when a linearly polarized wave having an electric field vibration plane parallel to the extinction axis passes through the polarization element by the intensity of the electric field when a linearly polarized wave having an electric field vibration plane parallel to the transmission axis passes through the polarization element. The polarization element with good characteristics means an element with a small insertion loss and a high extinction ratio.

As the polarization element using metal fine particles, a polarizing glass has been known in which acicular metal fine particles made of silver or copper are dispersed in a glass substrate such that the longitudinal direction thereof is aligned with a specific direction (hereinafter, the polarization element is referred to as a "metal fine particle dispersed polarizing glass"). A method of manufacturing the metal fine particle dispersed polarizing glass is described in detail in, for example, JP-A-5-208844 and the main points thereof are as follows.

<1> A glass material including cuprous chloride is prepared to have a desired composition, is melted at a temperature of about 1450° C., and is then annealed to the room temperature. <2> Then, a thermal treatment is performed to precipitate cuprous chloride fine particles in the glass. <3> After the cuprous chloride fine particles are precipitated, a preform with an appropriate shape is produced by a machining process. <4> The preform is heated and elongated under predetermined conditions, thereby obtaining acicular particles of cuprous chloride. <5> The elongated cuprous chloride is reduced in a hydrogen atmosphere to obtain acicular metallic copper fine particles.

A metal fine particle dispersed polarizing glass in which acicular metallic copper fine particles with a minor axis of 20 to 75 nm, a major axis of 120 to 350 nm, and an aspect ratio (value obtained by dividing the major axis of the acicular particle by the minor axis thereof) of 2.5 to 10 are dispersed in a base glass is manufactured by the manufacturing method, which is disclosed in JP-A-5-208844.

Patent Citation 1: JP-A-5-208844

DISCLOSURE OF INVENTION

Technical Problem

The metal fine particle dispersed polarizing glass according to the related art has an insertion loss of 0.1 dB or less and an extinction ratio of 30 dB or more. Therefore, there are few practical problems with the function of the metal fine particle dispersed polarizing glass. However, as described above, since the metal fine particle dispersed polarizing glass is manufactured by complicated processes, such as precipitation, elongation, and reduction, the reproducibility of the shape of the particles is not necessarily good. As a result, in some cases, it is difficult to obtain a desired extinction ratio and there is a problem regarding the stable production of the metal fine particle dispersed polarizing glass.

The invention has been made in order to solve the above-mentioned problems and an object of the invention is to provide a polarization element with high shape controllability and high productivity.

Technical Solution

In order to achieve the object, according to a first aspect of the invention, a polarization element includes: a substrate that transmits light with a predetermined wavelength; a plurality of metal pieces that is arranged in an island shape on the substrate; and a dielectric layer that covers the metal pieces. Desired polarization characteristics are obtained by a variation in the plasmon resonance frequency of the metal piece that depends on the polarization direction of light irradiated to the metal piece. The plasmon resonance frequency of the metal piece in a predetermined direction is substantially equal to the frequency of light irradiated to the polarization element. A real part (∎') and an imaginary part (∎") of the permittivity of a metal material forming the metal piece at the plasmon resonance frequency, and the refractive index ($n_a$) of the dielectric layer have the following relationship:

$$\{(\blacksquare'-n_a^2)^2+\blacksquare''^2\}\blacksquare 80 \cdot n_a \cdot \blacksquare''.$$

According to a second aspect of the invention, in the polarization element according to the first aspect, the total sum of the geometric cross sections of the metal pieces in a plane which is substantially perpendicular to the propagation direction of the light irradiated to the polarization element in a light radiation region may be smaller than the area of the light radiation region. The total sum of the absorption cross sections of the metal pieces at the plasmon resonance frequency may be equal to or more than 10 times the geometric area of the radiation region.

According to a third aspect of the invention, in the polarization element according to the first or second aspect, the metal piece may have a substantially rectangular parallelepiped shape, and the longest side of the substantially rectangular parallelepiped in an aggregate of the metal pieces may be aligned substantially in a constant direction.

According to a fourth aspect of the invention, in the polarization element according to the first or second aspect, the metal piece may have a substantially elliptical cylinder shape, and the major axis of the ellipse may be aligned substantially in a constant direction.

According to a fifth aspect of the invention, in the polarization element according to any one of the first to fourth aspects, the length of the metal piece in a direction parallel to the propagation direction of the irradiated light may be equal to or less than one-tenth of the wavelength of the irradiated light, and the dimensions of the metal piece in a plane perpendicular to the propagation direction of the irradiated light may be equal to or less than 1 μm.

According to a sixth aspect of the invention, in the polarization element according to any one of the first to fifth aspects, the metal piece may be made of Al or an Al alloy including Al and at least one of Si, Ag, and Au.

Advantageous Effects

The polarization element according to the invention can be manufactured by a process including a general nanoimprint lithography method as a main method. The polarization element has high productivity and high controllability and reproducibility of the shape and size of the metal fine particles, as compared to the metal fine particle dispersed polarizing glass according to the related art. As a result, according to the polarization element, it is possible to achieve stable production.

BEST MODE FOR CARRYING OUT THE INVENTION

When metal is divided into fine particles with a diameter sufficiently smaller than the wavelength of light, for example, a diameter of about several tens of nanometers, the movement of free electrons is limited by the boundary determined by the shape of the fine particles. Therefore, it is possible to treat the metal fine particles as a dielectric material that is uniformly polarized. In this case, a depolarization field is formed in the fine particles depending on the shape of the fine particles and affects a response to the electric field applied from the outside (hereinafter, referred to as an "external electric field"). In particular, when a response to the external electric field is delayed, energy loss occurs and light is resonantly absorbed at a specific frequency. The response to the external electric field is referred to as a so-called dielectric response function, $\varepsilon(\omega)$, and is represented by the following Expression (1):

$$\varepsilon(\omega) = 1 + \frac{\varepsilon^*(\omega)/\varepsilon_a - 1}{1 + [\varepsilon^*(\omega)/\varepsilon_a - 1]L}. \quad \text{[Expression 1]}$$

In Expression (1), $\omega$ indicates the angular frequency of irradiated light, $\varepsilon^*(\omega)$ indicates the dielectric response function of metal forming fine particles at $\omega$ (complex permittivity at $\omega$), $\varepsilon_a$ indicates the permittivity of a medium in the vicinity of the metal fine particles, and L indicates a depolarization factor determined by the shape of the fine particles.

The depolarization factor does not depend on the material forming the fine particles, but is determined by the shape of the fine particles. The depolarization factor is only analytically calculated when the fine particle has a spheroidal shape including a sphere. For example, when the fine particle has a spherical shape, the depolarization factor is isotropic and the value thereof is ⅓. When the fine particle has a prolate spheroid shape with an aspect ratio of about 3, the value of the depolarization factor depends on the direction. For example, the value of the depolarization factor in the major axis direction is 0.108 and the value in the minor axis direction is 0.446.

A light absorption coefficient, $\alpha$, according to the single fine particle is represented by the following Expression (2).

$$\alpha = \frac{2\pi \cdot n_a^3}{L^2 \cdot \lambda} \cdot \frac{\varepsilon''}{\left[\varepsilon' + \varepsilon_a \cdot \left(\frac{1}{L} - 1\right)\right]^2 + \varepsilon''^2}. \quad \text{[Expression 2]}$$

In Expression (2), $n_a$ indicates the refractive index of a medium in the vicinity of the metal fine particles, $\lambda$ indicates the vacuum wavelength of irradiated light ($\lambda = 2\pi c/\omega$, and c is the speed of light), and $\varepsilon'$ and $\varepsilon''$ indicate a real part and an imaginary part of complex permittivity ($\varepsilon^*(\omega)$) at the angular frequency $\omega$.

Figure 4:
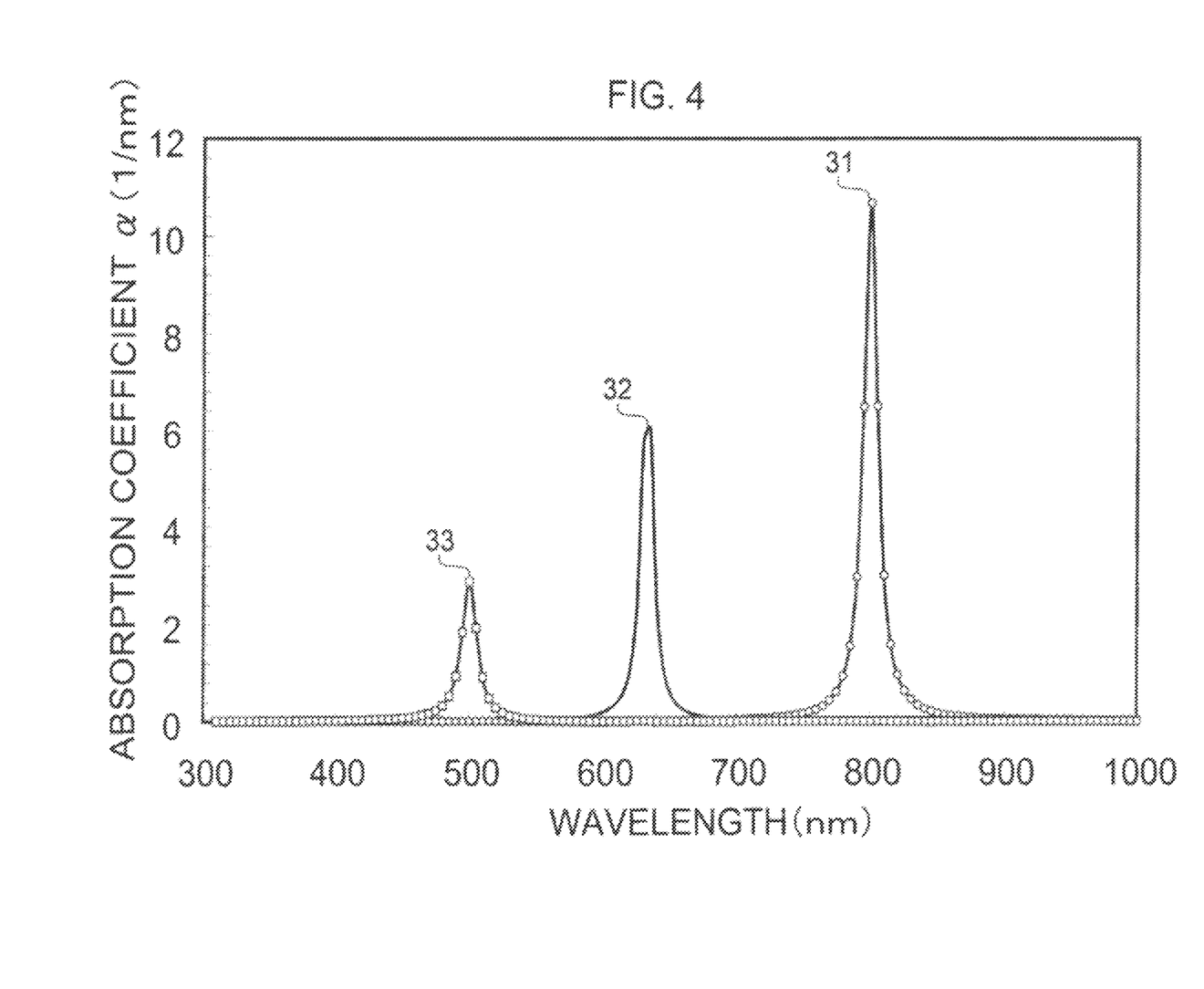
FIG. 4 is a depolarization factor dependence of the absorption spectrum.

FIG. 4 shows the influence of the depolarization factor on the spectrum of the absorption coefficient calculated by Expression (2) in the case of a metallic silver fine particle having a cigar-shaped spheroidal shape. In FIG. 4, reference numeral 31 indicates a spectrum when the depolarization factor of the metallic silver fine particle in the major axis direction is 0.065, reference numeral 32 indicates a spectrum when the depolarization factor is 0.108, and reference numeral 33 indicates a spectrum when the depolarization factor is 0.1867. During calculation, the refractive index of a medium in the vicinity of the silver fine particle was 1.45 (permittivity: 2.1025) and irradiated light was a linearly polarized wave having an electric field vibration plane in a direction parallel to the major axis direction of a spheroid. As shown in FIG. 4, in all of the depolarization factors, the absorption coefficient has the maximum value at a specific wavelength. The maximum value is obtained since the vibration of a free electron in the metallic silver fine particle resonates with the vibration of the applied electric field (corresponding to the vibration of an electric field component of the irradiated light), which is generally known as a plasmon resonance phenomenon (hereinafter, the wavelength of light where plasmon resonance occurs is referred to as a "plasmon resonance wavelength"). The plasmon resonance wavelength varies depending on the depolarization factor of the irradiated metal fine particle, more accurately, the depolarization factor in a direction parallel to the electric field vibration direction of irradiated light. When the depolarization factor is reduced, the plasmon resonance wavelength is shifted to a long wavelength side.

In the case of acicular particles, similar to the particles with the cigar-shaped spheroidal shape, the depolarization factor in the major axis direction is smaller than that in the minor axis direction and the plasmon resonance wavelengths are different in the two directions. In the metal fine particle dispersed polarizing glass according to the related art, the depolarization factor, that is, the aspect ratio of the acicular fine particle is determined such that the plasmon resonance wavelength of the acicular metal fine particle in the longitudinal direction is substantially equal to the desired wavelength of light. In this case, when a linearly polarized wave with a desired wavelength is irradiated to the acicular metal fine particle and the electric field vibration plane of the wave is aligned with the major axis direction of the acicular metal fine particle, the intensity of transmission light is greatly attenuated due to resonance absorption by the metal fine particle. In contrast, when the electric field vibration plane is aligned with the minor axis direction of the acicular metal fine particle, the resonance absorption by the metal fine particles does not occur. As a result, light passes through the acicular metal fine particle as the intensity thereof is hardly attenuated.

A mechanism for obtaining the polarization effect in the metal fine particle dispersed polarizing glass has been described above. For this reason, the polarizing glass is called an "absorption-type polarization element".

However, as described above, the depolarization factor is determined by the shape of the fine particle. Generally, a depolarization factor can be defined corresponding to a shape and a direction in the same way as spheroid. However, the depolarization factor can be represented by an analytic expression only when the fine particle has a well-defined spheroidal shape including a sphere. That is, it is possible to calculate the depolarization factor of a metal fine particle with a general shape numerically. In other words, for example, even though a fine particle has a rectangular parallelepiped shape, it is possible to obtain a depolarization factor of 0.065 by appropriately selecting the dimensional ratio of the length, width, and height of the fine particle.

As described above, the magnitude of the absorption coefficient, ■, shown in FIG. 4 is proportional to the extinction ratio of an "absorption-type polarizer". For example, when a fine particle having a rectangular parallelepiped shape with a thickness of 20 nm is assumed (here, the "thickness" means the length of the fine particle in a direction in which an irradiated linearly polarized plane wave is propagated) and the absorption coefficient, ■, is about 3 (dimension of 1/length), the intensity of light passing through the rectangular parallelepiped fine particle is exp(−60) and an extinction ratio of about −260 dB is obtained. The extinction ratio is significantly more than a required specification value, regardless of the field of application of the polarization element.

The inventors focused attention on the above points and thoroughly examined the polarization characteristics of a polarization element in which a plurality of metal fine particles with a rectangular parallelepiped shape was arranged in an island shape on an optically transparent substrate on the basis of the above-mentioned idea. The invention was achieved on the basis of the examination result (hereinafter, the polarizer having the above-mentioned structure is referred to as a "rectangular fine particle arranged polarization element").

Hereinafter, the rectangular fine particle arranged polarization element according to the invention will be described in detail.

Figure 5:
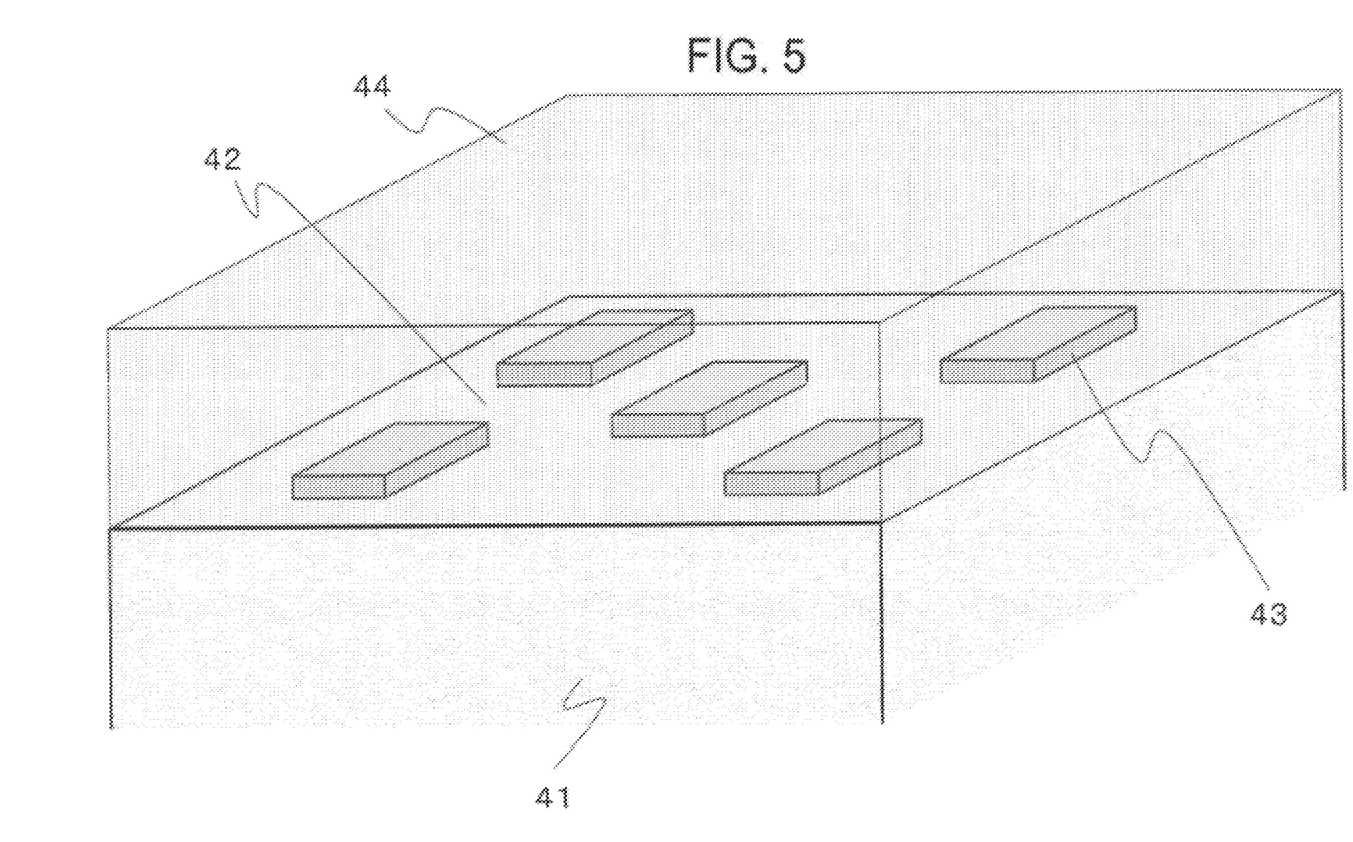
FIG. 5 is a perspective view illustrating an example of the structure of a rectangular fine particle arranged polarization element according to the invention.

FIG. 5 is a perspective view illustrating an example of the structure of the rectangular fine particle arranged polarization element according to the invention. In FIG. 5, reference numeral 41 indicates an optically transparent substrate, reference numeral 42 indicates a surface of the substrate 41, reference numeral 43 indicates a metal piece with a rectangular parallelepiped shape, and metal piece 44 indicates an optically transparent dielectric film. As shown in FIG. 5, in the rectangular fine particle arranged polarization element according to the invention, a plurality of metal pieces 43 with a rectangular parallelepiped shape having a size of several tens of nanometers to several hundreds of nanometers is arranged in an island shape on the surface 42 of the substrate 41, which is a glass substrate transmitting light with a desired wavelength, such as a quartz glass substrate, or a substrate made of a single crystal, such as sapphire, and the metal pieces are covered with a dielectric film that is made of, for example, $SiO_2$ and transmits light with a desired wavelength.

Next, the polarization effect of the rectangular fine particle arranged polarization element will be described.

As described above, the plasmon resonance wavelength of the metal piece 43 is determined by the permittivity and the depolarization factor of the material forming the metal piece. For example, it is assumed that the depolarization factor of the metal piece 43 in the long side direction is set such that the plasmon resonance occurs with respect to the wavelength of irradiated light and the depolarization factor of the metal piece 43 in the short side direction is set so as to deviate from the depolarization factor of the metal piece 43 in the long side direction. This will be described in detail in examples. This relationship between the depolarization factor is established by appropriately setting the dimensional ratio of the sides of the rectangular parallelepiped.

In the above-mentioned structure, when a linearly polarized wave is irradiated in a direction that is substantially parallel to the normal direction of the surface 42 of the substrate and the electric field vibration plane of the linearly polarized wave is parallel to the long side direction of the rectangular-parallelepiped-shaped metal piece 43, the energy of the irradiated light is absorbed by the plasmon resonance occurring in the rectangular-parallelepiped-shaped metal piece 43 and the intensity of transmission light is greatly attenuated. In contrast, when the electric field vibration plane of the irradiated linearly polarized wave is parallel to the short side direction of the rectangular-parallelepiped-shaped metal piece 43, there is no energy loss due to the plasmon resonance.

The operating principle of the rectangular fine particle arranged polarization element has been described above.

The inventors examined the influence of the area occupancy of a metal species and the metal piece 43 in the surface 42 of the substrate on the extinction ratio on the basis of the above-mentioned idea. As a result of the examination, the following peculiar phenomenon was found and the invention was achieved.

Figure 6:
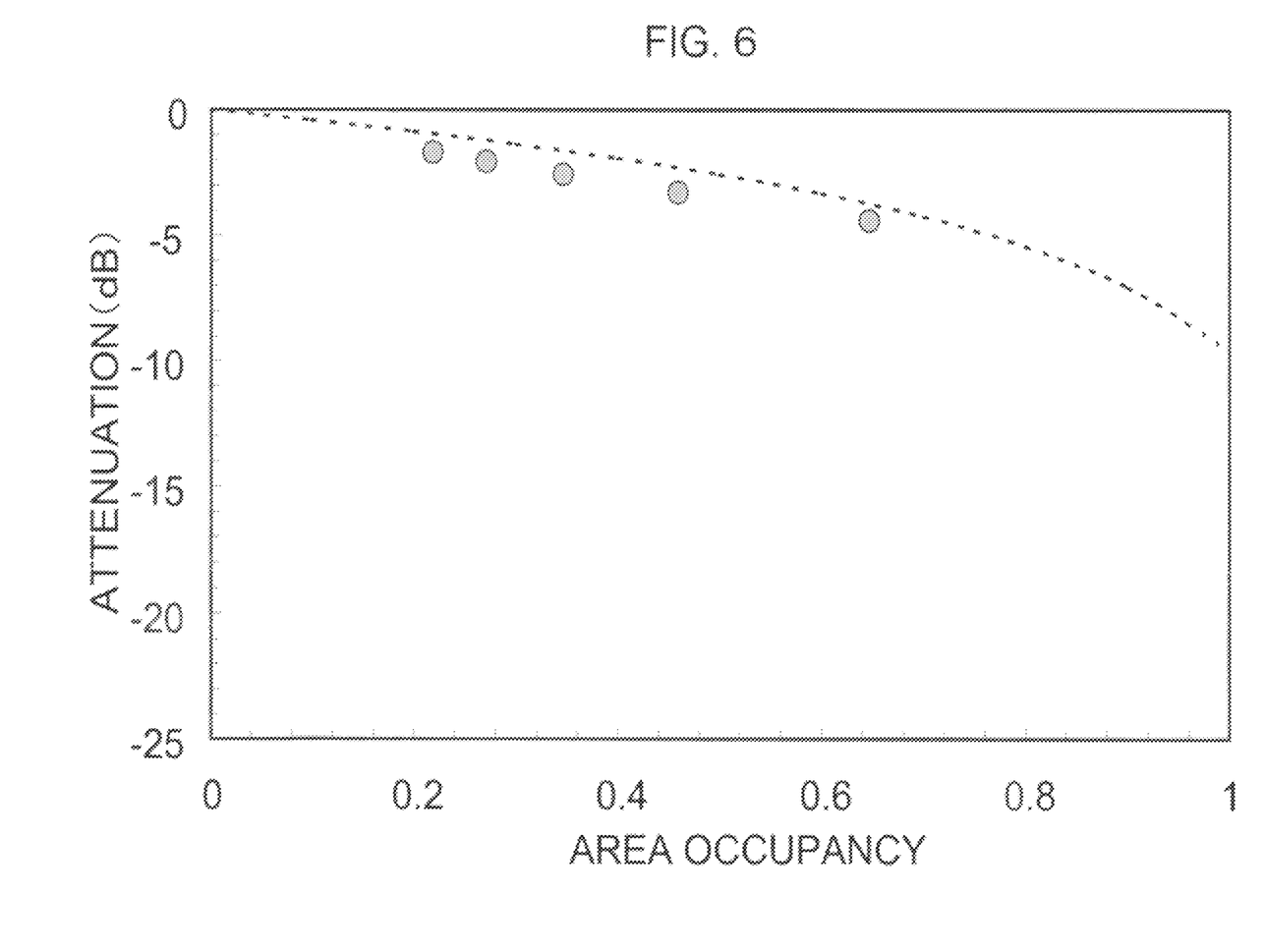
FIG. 6 is a relationship between the area occupancy and the attenuation of transmitted light when a metal piece is Ti.

FIG. 6 shows the relationship between the area occupancy and attenuation when the metal species is Ti. The Ti piece has a substantially rectangular parallelepiped shape and the dimensions of the long side, the short side, and the height (a thickness from the substrate surface, which is the same with the following description) are 95 nm, 25 nm, and 20 nm, respectively. The substrate is made of quartz glass and the dielectric film is made of $SiO_2$.

Figure 9:
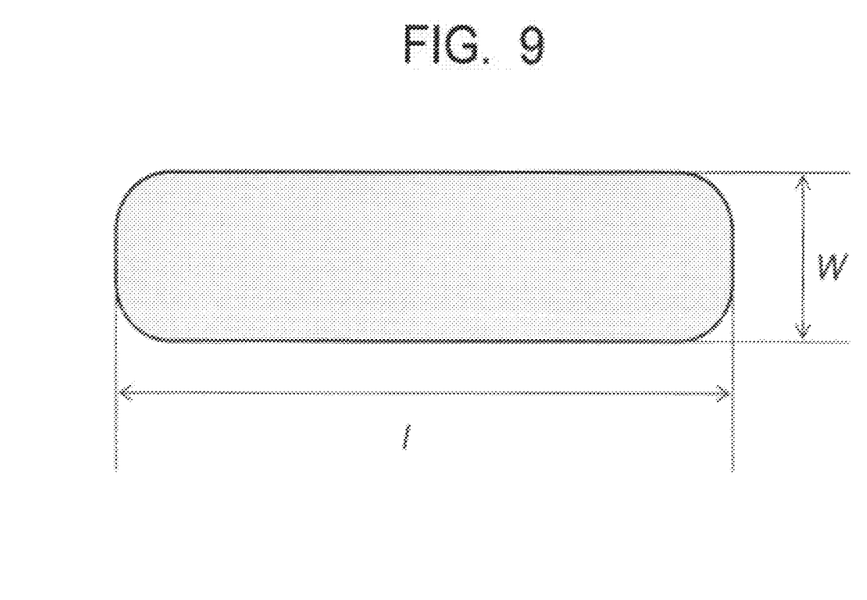
FIG. 9 is a diagram schematically illustrating the meaning of a substantially rectangular parallelepiped shape.

Next, the term "substantially rectangular parallelepiped shape" in the specification will be described. FIG. 9 is a diagram schematically illustrating the planar shape of a metal piece (the shape of the metal piece in the plane substantially perpendicular to the propagation direction of irradiated light). That is, the term "substantially rectangular parallelepiped shape" means a rectangular parallelepiped shape with round corners. The long side and the short side mean l and w in FIG. 9.

In this structure, the plasmon resonance wavelength of the Ti piece in the long side direction is in the range of 630 nm to 650 nm. The area occupancy was changed by changing the spacing between the Ti pieces with the same shape. The term "attenuation" means the ratio (unit: dB) between the intensity of transmission light and the intensity of irradiated light when a linearly polarized wave having an electric field vibration plane in a direction parallel to the long side direction of the Ti piece is irradiated.

In FIG. 6, a symbol ■ indicates attenuation that is actually obtained, a dashed line indicates the relationship between the attenuation and the area occupancy, and the attenuation, $I_{geo}$, is calculated by the following expression (3). It is assumed that the attenuation is simply proportional to the area occupancy.

$$I_{geo} = 10 \cdot \log\left[\frac{I_t \cdot s + I_0 \cdot (1-s)}{I_0}\right] \quad \text{[Expression 3]}$$

In Expression (3), $I_0$ indicates the intensity of irradiated light, $I_t$ indicates the intensity of light passing through the Ti piece, and s indicates the area occupancy of the piece.

As shown in FIG. 6, in the case of the Ti piece, as the area occupancy increases, the attenuation increases. The value of the attenuation is substantially equal to the attenuation, Igeo, which is simply calculated from the area occupancy. When the electric field vibration plane of the irradiated light is parallel to the short side direction of the Ti piece, the attenuation thereof does not depend on the area occupancy, but is about 1 dB.

Figure 7:
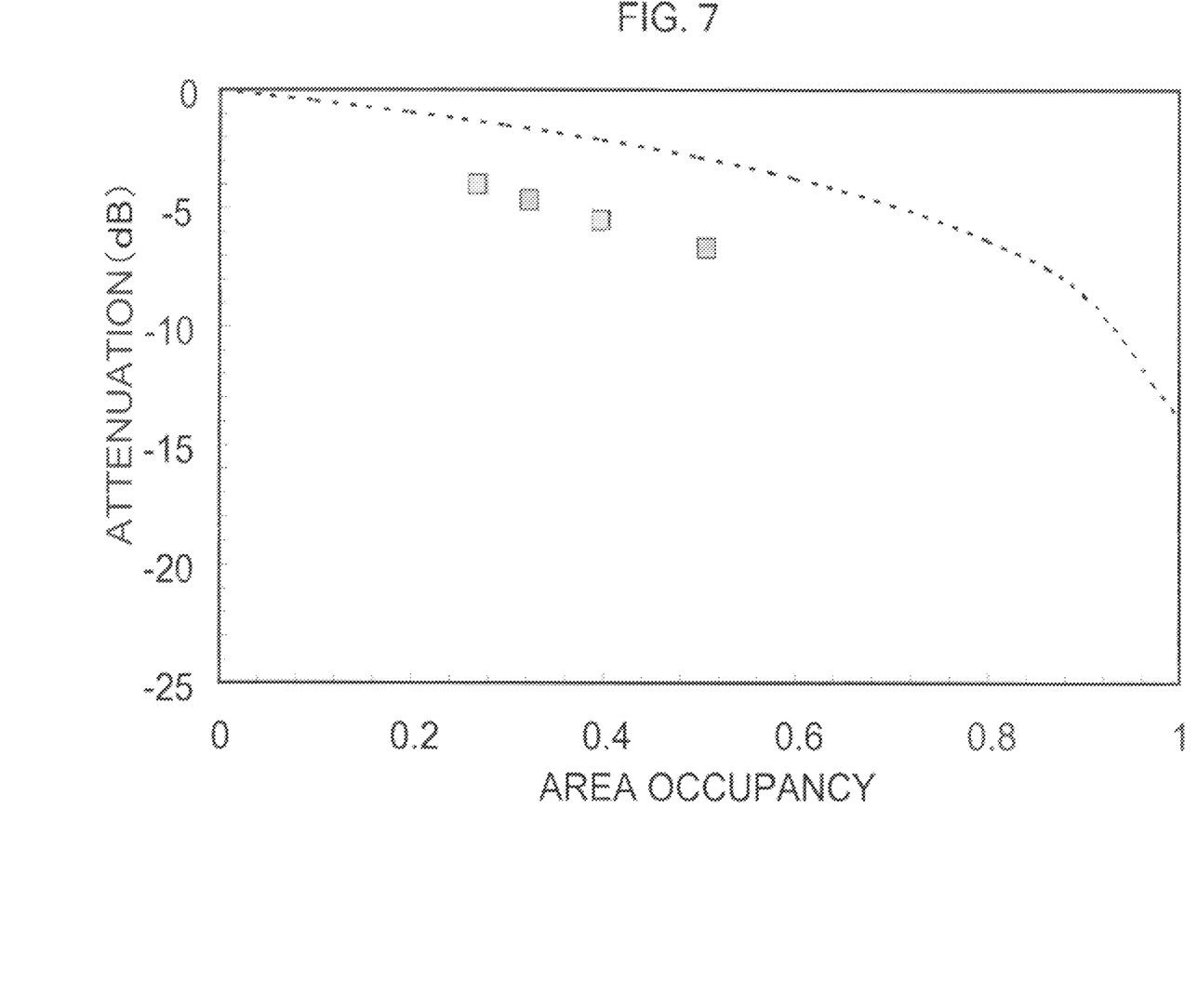
FIG. 7 is a relationship between the area occupancy and the attenuation of transmitted light when a metal piece is Cr.

FIG. 7 shows the relationship between the area occupancy and the attenuation, which is the same as that shown in FIG. 6, when the metal species is Cr. The Cr piece has a rectangular parallelepiped shape and the dimensions of the long side, the short side, and the height of the piece are 250 nm, 26 nm, and 20 nm, respectively. Similar to the Ti piece, the substrate and the dielectric film are made of quartz glass and $SiO_2$, respectively. In this structure, the plasmon resonance wavelength of the Cr piece in the long side direction is in the range of 630 nm to 650 nm. The area occupancy was changed by changing the spacing between the Cr pieces with the same shape.

In FIG. 7, a symbol ■ indicates the actually obtained attenuation and a dashed line indicates the relationship between the attenuation and the area occupancy. It is assumed that the attenuation is simply proportional to the area occupancy and is calculated in the same way as that in FIG. 6. In the case of the Cr piece, as a result of calculation, the attenuation in the same area occupancy is more than that in the Ti piece and there is a large difference between the attenuation and the attenuation represented by the dashed line. When the electric field vibration plane of the irradiated light is parallel to the short side direction of the Cr piece, the attenuation thereof does not depend on the area occupancy, but is about 1 dB.

Figure 8:
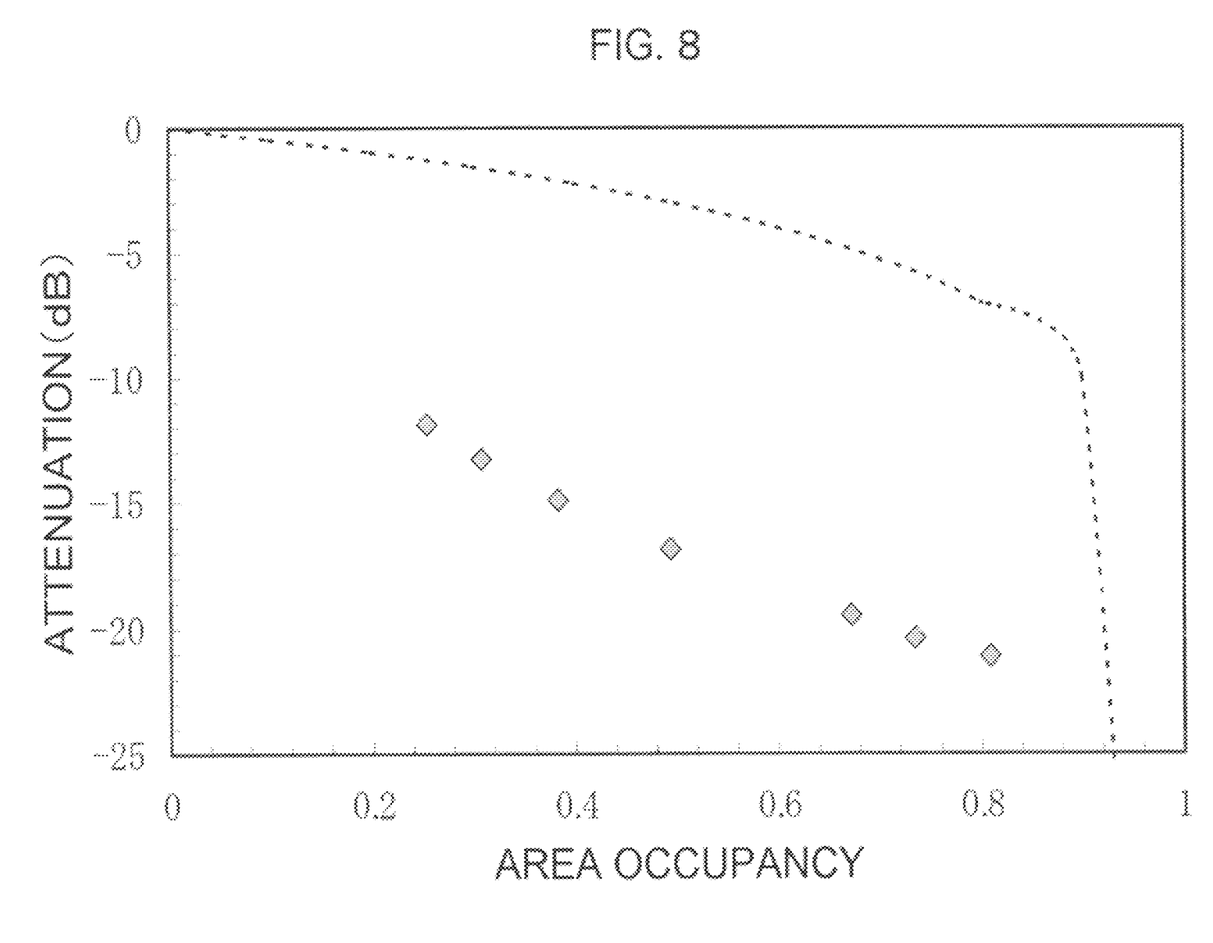
FIG. 8 is a relationship between the area occupancy and the attenuation of transmitted light when a metal piece is Al.

FIG. 8 shows the relationship between the area occupancy and the attenuation, which is the same as those shown in FIGS. 6 and 7, when the metal species is Al. The Al piece has a rectangular parallelepiped shape and the dimensions of the long side, the short side, and the height of the piece are 180 nm, 25 nm, and 20 nm, respectively. Similar to the Ti and Cr pieces, the substrate and the dielectric film are made of quartz glass and $SiO_2$, respectively. In this structure, the plasmon resonance wavelength of the Al piece in the long side direction is in the range of 630 nm to 650 nm. The area occupancy was changed by changing the spacing between the Al pieces with the same shape.

In FIG. 8, a symbol ■ indicates the actually obtained attenuation and a dashed line indicates the relationship between the attenuation and the area occupancy. It is assumed that the attenuation is simply proportional to the area occupancy and is calculated in the same way as that in FIGS. 6 and 7. In the case of the Al piece, the attenuation in the same area occupancy is more than that in the Ti and Cr pieces and there is a large difference between the attenuation and the attenuation represented by the dashed line. When the electric field vibration plane of the irradiated light is parallel to the short side direction of the Al piece, the attenuation thereof does not depend on the area occupancy, but is in the range of about 0.5 dB to 0.7 dB.

Figure 3:
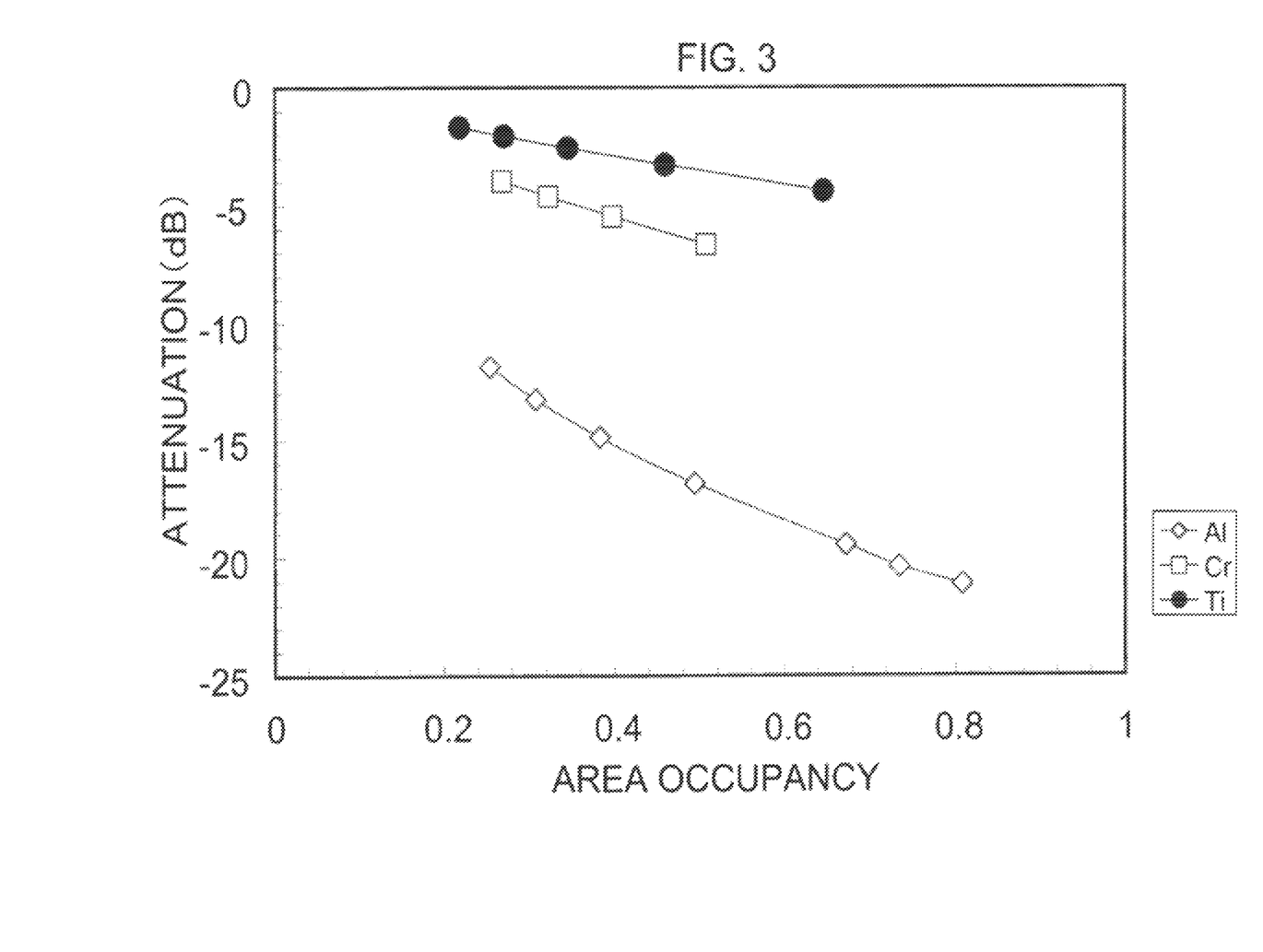
FIG. 3 is a relationship between area occupancy and attenuation in various kinds of metal piece materials.

In the result shown in FIGS. 6 to 8, there is a peculiar phenomenon in that, in all of the metal species, the attenuation that is actually obtained is more than that simply calculated from the area occupancy on one level or another. The result shows that, although the rationale is unclear, a portion of the light irradiated to a region in which there is no metal piece as well as the light irradiated to the metal piece 43 is "absorbed" by the metal piece 43 and the intensity of the light is attenuated in FIG. 5. FIG. 3 shows the relationship between the area occupancy and the attenuation for each of the metal pieces shown in FIGS. 6 to 8. In the same area occupancy, the attenuation in Al is the largest, followed by Cr and Ti and the difference between the attenuation that is actually obtained and the attenuation simply calculated from the area ratio increases in this order.

That is, the inventors' examination proved that the attenuation (corresponding to the extinction ratio) in the rectangular fine particle arranged polarization element largely depended on the "absorption efficiency" as well as the absorption characteristics of the metal piece.

The inventors focused their attention on the concept "absorption cross section" in the plasmon resonance and found that, by introducing this concept, the relationship between the area occupancy and the attenuation considering the "absorption efficiency" of the metal piece could be obtained. The absorption cross section, Cabs, in the plasmon resonance is represented by the following Expression (4).

$$Cabs = \frac{2\pi \cdot n_a^3 \cdot V}{L^2 \cdot \lambda} \cdot \frac{\varepsilon''}{\left[\varepsilon' + n_a^2 \cdot \left(\frac{1}{L} - 1\right)\right]^2 + \varepsilon''^2}$$ [Expression 4]

In Expression (4), V indicates the volume of the metal piece and the other parameters are the same as those in Expression (3). As can be seen from the comparison between Expression (4) and Expression (3), the absorption cross section is the product of the absorption coefficient, ■, and the volume, V, of the metal piece.

Figure 2:
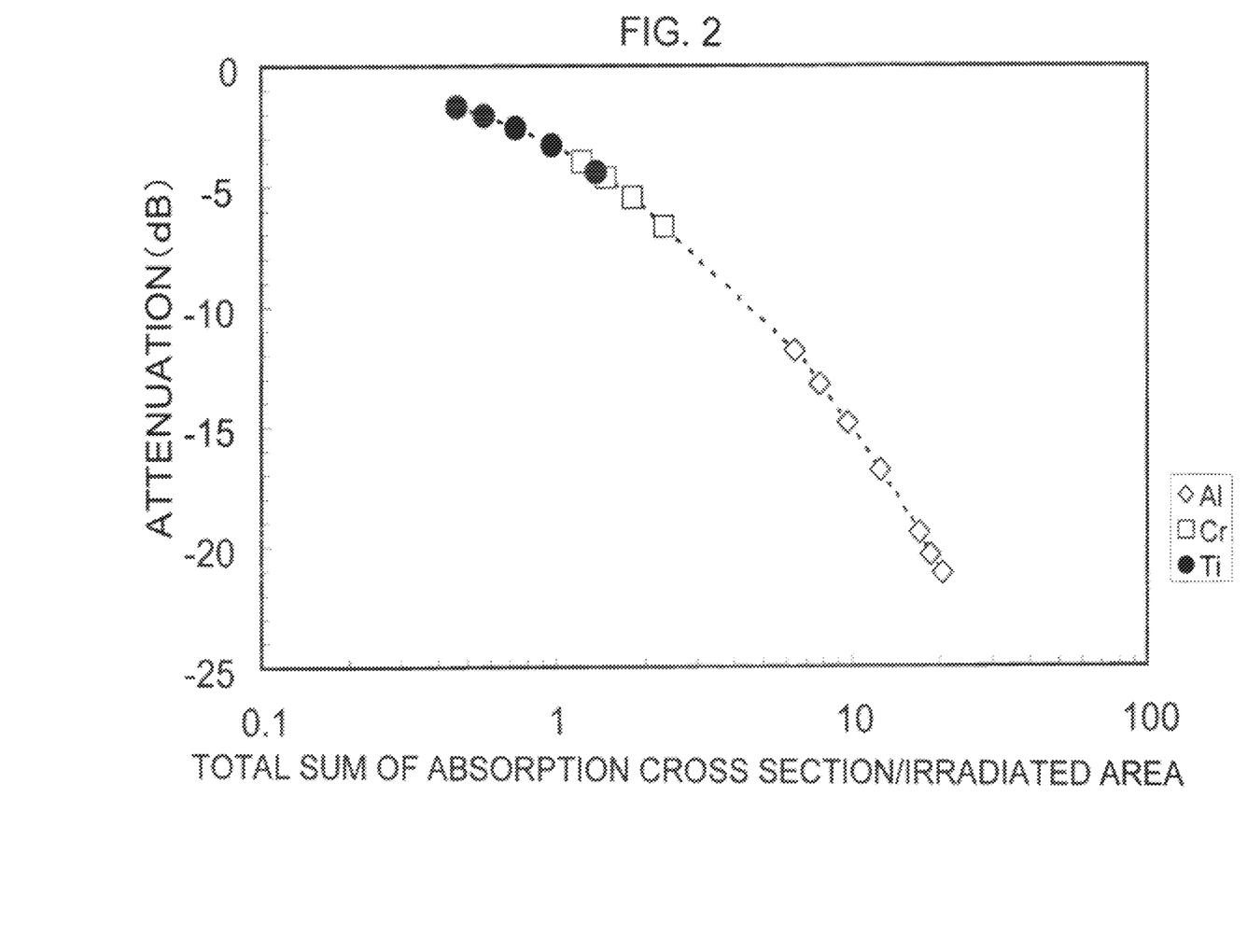
FIG. 2 is a relationship between (the total sum of the absorption cross section)/(irradiated area) and the extinction ratio.

FIG. 2 shows a variation in the attenuation with respect to the ratio of the total sum of the absorption cross section, Cabs, obtained from Expression (4) to the area of a light radiation region, in each light radiation region for each metal piece. The meaning of the ratio of the total sum of the absorption cross section, Cabs, to the area of the radiation region is not necessarily limited to the light radiation region. For example, when the metal piece is arranged as a radiation portion in a region that is sufficiently wider than the light radiation region, the ratio means the ratio of the total sum of the absorption cross section to the area of the region.

As can be seen from FIG. 2, the actually obtained attenuation is distributed substantially on a single curve. As described above, if it is considered that the attenuation when the electric field vibration plane of the irradiated linearly polarized wave is parallel to the short side of the metal piece does not depend on the area occupancy of the metal piece, but is almost 1 dB, the attenuation shown in FIG. 2 substantially corresponds to the extinction ratio.

The extinction ratio required for the polarization element varies depending on the purposes. For example, when the application of the polarization element to a visible light range, such as a liquid crystal projector, is considered, an extinction ratio of about 15 dB or more is required though the extinction ratio depends on the kind of optical system or the position of the polarization element used. In the rectangular fine particle arranged polarization element, as can be seen from the result shown in FIG. 2, the extinction ratio is achieved when the ratio between the total sum of the absorption cross section of the metal pieces and the area of the radiation region is substantially equal to or more than 10.

However, in the rectangular fine particle arranged polarization element, it is necessary to effectively generate the plasmon resonance in each metal piece in order to obtain polarization characteristics. In order to generate the plasmon resonance, first, it is necessary to set the shape of the metal piece, that is, the depolarization factor such that the plasmon resonance occurs at the wavelength of the irradiated light. This condition is achieved by setting the depolarization factor, L, such that the absorption cross section, Cabs, has the maximum value in Expression (4). In this case, the maximum value of the absorption cross section, Cabs, is represented by the following Expression 5.

$$C_{abs}^{max} = \frac{2\pi \cdot V}{\lambda} \cdot \frac{(\varepsilon' - n_a^2) + \varepsilon''^2}{n_a \cdot \varepsilon''}$$ [Expression 5]

In Expression (5), $Cabs^{max}$ indicates the maximum value of the cross section, Cabs.

From an optical point of view regarding the requirements for effectively generating the plasmon resonance, it is necessary to apply a uniform electric field to each metal piece using irradiated light. In order to meet the requirements, it is preferable that the height of the metal piece be equal to or less than one-tenth of the wavelength of the irradiated light. When the surface of the substrate having the metal pieces arranged thereon is completely perpendicular to the propagation direction of the irradiated light, a uniform electric field is applied to the surface. Therefore, the dimensions of the metal piece are not restricted as long as the ratio between the long side and the short side of the metal piece is determined such that the wavelength of the irradiated light is equal to the plasmon resonance wavelength of the metal piece. However, it is difficult to make the surface completely perpendicular to the propagation direction of the irradiated light in practice. Therefore, it is preferable that the long and short sides of the metal piece be equal to or less than 1■m.

For example, from the viewpoint of a manufacturing process, there are the following restrictions in the dimensions of the metal piece.

Figure 10:
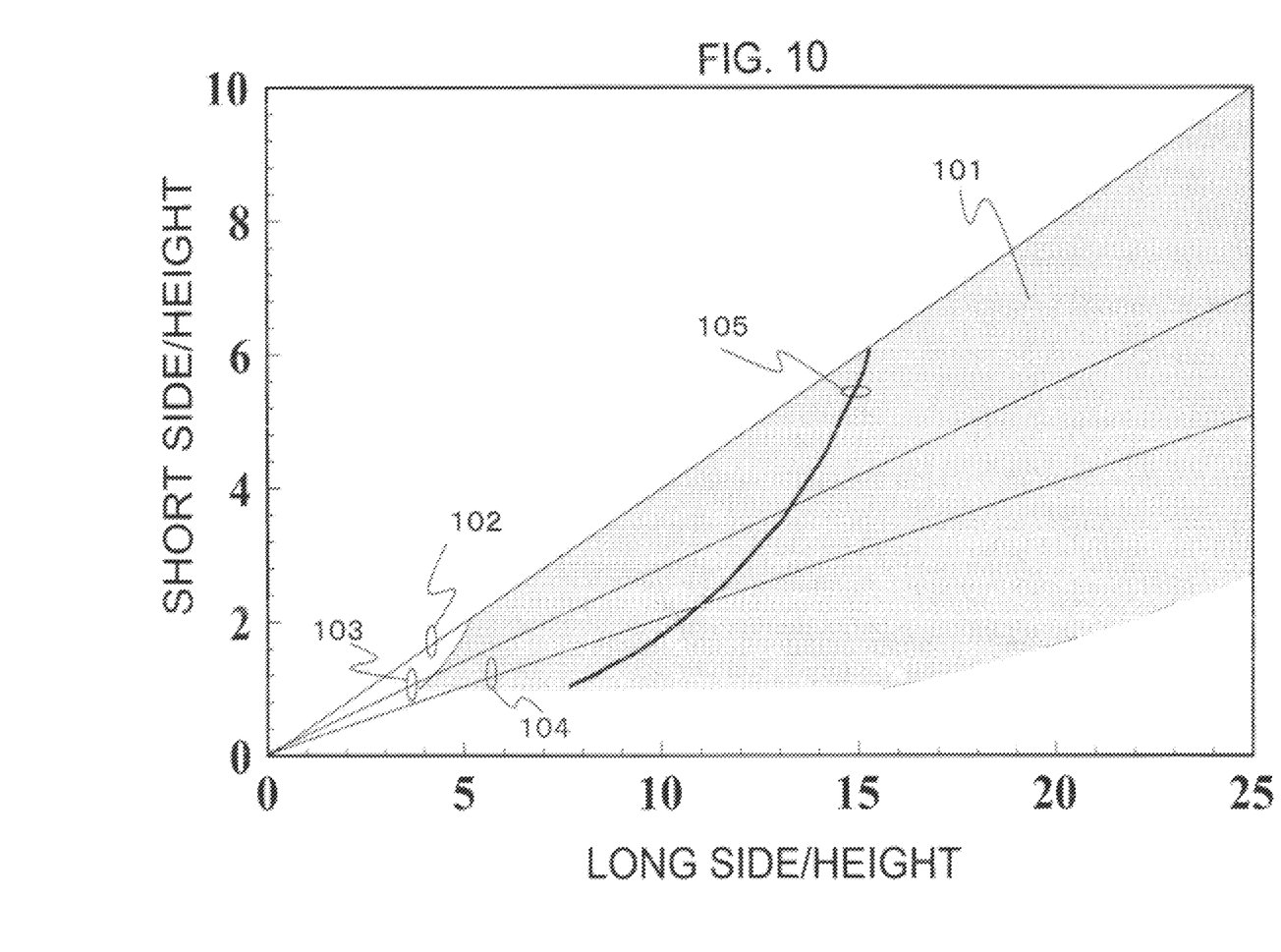
FIG. 10 is a diagram illustrating the relationship between the dimensional ratio and the depolarization factor of a piece with a rectangular parallelepiped shape.

The inventors numerically calculated the influence of the dimensional ratio of the long side, short side, and height of the metal piece on the depolarization factor in the long side direction when the ratio between the long side and the short side of a rectangular parallelepiped is equal to or more than 2.5. FIG. 10 shows an example of the result. In FIG. 10, the horizontal axis indicates the ratio between the long side and the height, and the vertical axis indicates the ratio between the short side and the height. In FIG. 10, a shaded region 101 indicates a region in which the depolarization factor in the long side direction is in the range of 0.01 to 0.07, reference numeral 102 is a line indicating the relationship between the long side and the short side where the ratio between the long side and the short side is 2.5, reference numeral 103 is a line indicating the relationship between the long side and the short side where the ratio between the long side and the short side is 3.5, reference numeral 104 is a line indicating the relationship between the long side and the short side where the ratio between the long side and the short side is 4.5, and 105 is a line indicating the relationship between the long side and the short side where the depolarization factor in the long side direction is 0.03. In the region 101, the depolarization factor in the long side direction is reduced as the ratio between the long side and the height increases, when the ratio between the short side and the height is constant.

In the case of the rectangular parallelepiped shape, as represented by the line 105, the relationship between the long side and the short side where the depolarization factor in the long side direction is constant is not unambiguously determined. For example, as shown in FIG. 10, a depolarization factor of 0.03 is obtained when the ratio between the long side and the short side is 2.5, 3.5, and 4.5. In this case, the depolarization factor in the short side direction and the height direction are changed according to the ratio between the long side and the short side. In particular, the depolarization factor in the short side direction increases as the ratio increases. As a result, the difference between the depolarization factor in the long side direction and the depolarization field coefficient in the short side direction increases.

For example, when the depolarization factor of the metal piece with a rectangular parallelepiped (including a substantially rectangular parallelepiped shape) shape in the long side direction is set such that plasmon resonance occurs for the wavelength of the irradiated light, it is important to sufficiently separate the plasmon resonance wavelength in the short side direction from the wavelength of the irradiated light in order to reduce insertion loss. The requirements are achieved by increasing the difference between the depolarization factor in the long side direction and the short side direction, that is, increasing the ratio between the long side and the short side (for example, see Expression (4)). That is, for example, in the case of the line 105 shown in FIG. 10, it is preferable that both the ratio between the short side and the height and the ratio between the long side and the height along the line are small.

However, in order to stably mass-produce the rectangular fine particle arranged polarization element according to the invention using, for example, nanoimprint lithography, the limit of the length of the short side of a metal piece with a rectangular parallelepiped shape (including a substantially rectangular parallelepiped shape) and the limit of the spacing between adjacent pieces are substantially 30 nm. For example, when considering that the length of the long side is four to five times more than that of the short side, the limit of the geometric area occupancy of the metal piece in the light radiation region is 40% to 45% from the viewpoint of stable mass production.

The limit of the height of the metal piece is substantially 30 nm due to restrictions in an etching process. When an application to the visible light region ($\lambda$: 400 to 600 nm) is considered, the ratio of the height of the metal piece to the wavelength of the irradiated light is in the range of 3/40 to 1/20.

When considering the restrictions in the shape of the metal piece shape and the requirements for the ratio of the total sum of the absorption cross section of the metal piece to the area of the radiation region to be substantially equal to or more than 10 in order to obtain an extinction ratio of 15 dB or more, the permittivity ($\varepsilon'$ and $\varepsilon''$) of a metal piece material and the refractive index ($n_a$) of a medium in the vicinity of the metal piece need to satisfy the following relational expression.

$$\frac{(\varepsilon' - n_a^2)^2 + \varepsilon''^2}{n_a \cdot \varepsilon''} \geq 80 \qquad \text{[Expression 6]}$$

The invention will be described in detail using examples.

COMPARATIVE EXAMPLE

As a comparative example, thin films of each metal material shown in Table 1 were formed with a thickness of 30 nm on a quartz glass substrate with a size of 1 inch by 1 inch by a vapor deposition method or a sputtering method (only a Ti thin film was formed by a vapor deposition method). Then, each metal piece with a substantially rectangular parallelepiped shape having the long side and the short side shown in Table 1 was formed by nanoimprint lithography and an ion etching method. After the piece group was formed, a $SiO_2$ film with a thickness of about 400 nm was formed so as to cover the metal piece group, thereby manufacturing a rectangular fine particle arranged polarization element. The spacing between adjacent pieces is 30 nm in both the long side direction and the short side direction. The pieces are formed in a region with a size of about 5 mm×5 mm which is sufficiently wider than a region to which a laser beam is irradiated, which will be described below.

Thin films (the thickness of only Cr is 100 nm) of each metal material were formed with a thickness of about 200 nm on a quartz glass substrate with a size of 1 inch by 1 inch by the same method as described above. Then, the refractive index and the extinction coefficient at a light wavelength of 630 nm were measured by an ellipsometer. Then, the real part and the imaginary part of permittivity shown in Table 1 were calculated from the refractive index and the extinction coefficient.

The insertion loss and the extinction ratio of each polarization element were measured using a semiconductor laser with a wavelength of 630 nm and a beam diameter of about 1 mm. Table 1 shows the measured extinction ratio, the geometric area occupancy of the pieces in the region (5 mm×5 mm) in which the metal piece group is formed, and the ratio of the total sum of the absorption cross section of the metal piece group calculated by Expression (4) to the area of a region where the metal piece group formed, that is, (absorption cross section)/(irradiated area) for each polarization element.

Figure 1:
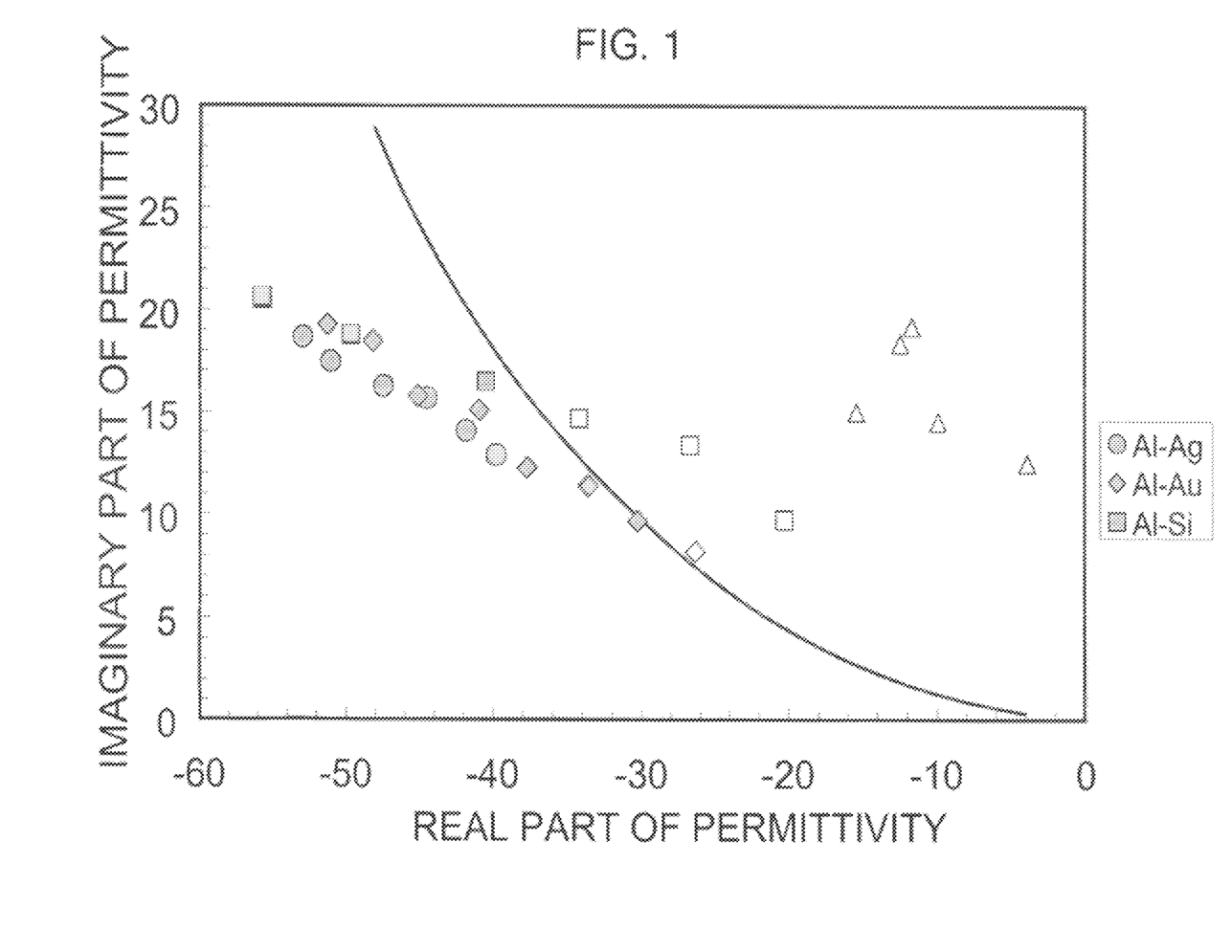
FIG. 1 is a plot of a real part and an imaginary part of permittivity where a high extinction ratio is obtained.

In FIG. 1, a symbol ■ shows the real part and the imaginary part of the permittivity of each metal material shown in Table 1. In FIG. 1, a curve indicates the relationship between the real part and the imaginary part of permittivity satisfying the following Expression (7).

$$\frac{(\varepsilon' - n_a^2)^2 + \varepsilon''^2}{n_a \cdot \varepsilon''} = 80 \qquad \text{[Expression 7]}$$

As shown in FIG. 1 and Table 1, the permittivity of the metal material according to the comparative example did not satisfy the relationship of Expression (6) and the obtained extinction ratio was did not exceed 10 dB.

TABLE 1

| Metal species | Permittivity (•: 630 nm) | | Shape of piece (height: 30 nm) | | Geometric area occupancy | Extinction ratio (dB) | (Absorption cross section)/ (irradiated area) |
|---|---|---|---|---|---|---|---|
| | Real part | Imaginary part | Long side (nm) | short side (nm) | | | |
| Co | −12.5 | 18.2 | 140 | 30 | 0.41 | 7.5 | 2.6 |
| Cr | −6.1 | 31.2 | 300 | 25 | 0.41 | 8.3 | 2.9 |
| Ni | −10.1 | 14.5 | 115 | 30 | 0.40 | 6.5 | 2.0 |
| Pt | −11.7 | 19.5 | 150 | 30 | 0.42 | 7.5 | 2.5 |
| Ti | −3.8 | 12.5 | 125 | 30 | 0.40 | 4.1 | 1.3 |
| Pd | −15.4 | 15.1 | 115 | 30 | 0.40 | 6.7 | 2.9 |

Example 1

In Example 1, Al—Au alloys with different Au concentrations shown in Table 2 were used as metal piece materials. Each of the Al—Au alloys with different Au concentrations was formed with a thickness of 30 nm on a quartz glass substrate with a size of 1 inch by 1 inch by a vapor deposition method, and a rectangular fine particle arranged polarization element having the piece shape shown in Table 2 was manufactured by substantially the same method as that in the comparative example. The Au concentration shown in Table 2 is a composition as an evaporation source.

Similar to the comparative example, each of the Al—Au alloy thin films with different Au concentrations was formed with a thickness of 200 nm by the vapor deposition method, and the real part and the imaginary part of the permittivity were calculated from the refractive index and the extinction coefficient.

Table 2 shows the extinction ratio measured by the same method as that in the comparative example, the geometric area occupancy of the pieces calculated by the same method as that in the comparative example, and (absorption cross section)/(irradiated area). In FIG. 1, symbols ■ and ■ shows the real part and the imaginary part of the permittivity at each Au concentration shown in Table 2. The closed symbol ■ means that an obtained extinction ratio is 15 dB or more and it has an Au concentration of 10 at % to 55 at %. The symbol ■ shows a low extinction ratio of 13.5 dB.

The result shown in FIG. 1 and Table 2 proved that, when Expression (6) was satisfied, a high extinction ratio of 15 dB or more was obtained.

Example 2

In Example 2, Al—Ag alloys with different Ag concentrations shown in Table 3 were used as metal piece materials.

Each of the Al—Ag alloys with different Ag concentrations was formed with a thickness of 30 nm on a quartz glass substrate with a size of 1 inch by 1 inch by a vapor deposition method, and a rectangular fine particle arranged polarization element having the piece shape shown in Table 3 was manufactured by substantially the same method as that in the comparative example. The Ag concentration shown in Table 3 is a composition as an evaporation source.

Similar to the comparative example, each of the Al—Ag alloy thin films with different Ag concentrations was formed with a thickness of 200 nm by the vapor deposition method, and the real part and the imaginary part of permittivity were calculated from the refractive index and the extinction coefficient.

Table 3 shows the extinction ratio measured by the same method as that in the comparative example, the geometric area occupancy of the pieces calculated by the same method as that in the comparative example, and (absorption cross section)/(irradiated area). In FIG. 1, a symbol ■ shows the real part and the imaginary part of the permittivity at each Ag concentration shown in Table 3.

The result shown in FIG. 1 and Table 3 proved that the Al—Ag alloy satisfied the relationship of Expression (6) and a high extinction ratio of 15 dB or more was obtained.

TABLE 2

| Au concentration (at %) | Permittivity (•: 630 nm) | | Shape of piece (height: 30 nm) | | Geometric area occupancy | Extinction ratio (dB) | (Absorption cross section)/ (irradiated area) |
|---|---|---|---|---|---|---|---|
| | Real part | Imaginary part | Long side (nm) | short side (nm) | | | |
| 0 | −55.7 | 20.6 | 215 | 30 | 0.44 | 20.0 | 16.8 |
| 10 | −51.3 | 19.3 | 205 | 30 | 0.44 | 19.1 | 15.0 |
| 15 | −48.2 | 18.5 | 195 | 30 | 0.43 | 17.5 | 13.9 |
| 25 | −45.1 | 15.8 | 185 | 30 | 0.43 | 17.0 | 13.9 |
| 30 | −40.9 | 15.1 | 175 | 30 | 0.43 | 16.1 | 12.1 |
| 40 | −37.7 | 12.3 | 160 | 30 | 0.42 | 17.0 | 12.3 |
| 50 | −33.6 | 11.4 | 145 | 30 | 0.41 | 15.1 | 10.5 |
| 55 | −30.3 | 9.7 | 135 | 30 | 0.41 | 15.0 | 9.9 |
| 65 | −26.3 | 8.3 | 115 | 30 | 0.40 | 13.5 | 8.6 |

TABLE 3

| Ag concentration (at %) | Permittivity (•: 630 nm) | | Shape of piece (height: 30 nm) | | Geometric area occupancy | Extinction ratio (dB) | (Absorption cross section)/ (irradiated area) |
| --- | --- | --- | --- | --- | --- | --- | --- |
| | Real part | Imaginary part | Long side (nm) | short side (nm) | | | |
| 10 | −53 | 18.7 | 205 | 30 | 0.44 | 19.5 | 16.5 |
| 20 | −51.1 | 17.5 | 200 | 30 | 0.43 | 18.7 | 16.1 |
| 30 | −47.5 | 16.3 | 190 | 30 | 0.43 | 17.6 | 14.9 |
| 40 | −44.5 | 15.7 | 180 | 30 | 0.43 | 18.3 | 13.6 |
| 50 | −41.8 | 14.1 | 170 | 30 | 0.43 | 16.5 | 13.2 |
| 60 | −39.8 | 12.9 | 165 | 30 | 0.42 | 18.4 | 13.0 |

Example 3

In Example 3, Al—Si alloys with different Si concentrations shown in Table 4 were used as metal piece materials. Each of the Al—Si alloys with different Si concentrations was formed with a thickness of 30 nm on a quartz glass substrate with a size of 1 inch by 1 inch by a vapor deposition method, and a rectangular fine particle arranged polarization element having the piece shape shown in Table 4 was manufactured by substantially the same method as that in the comparative example. The Si concentration shown in Table 4 is a composition as an evaporation source.

Similar to the comparative example, each of the Al—Si alloy thin films with different Si concentrations was formed with a thickness of 200 nm by the vapor deposition method, and the real part and the imaginary part of permittivity were calculated from the refractive index and the extinction coefficient.

Table 4 shows the extinction ratio measured by the same method as that in the comparative example, the geometric area occupancy of the pieces calculated by the same method as that in the comparative example, and (absorption cross section)/(irradiated area). In FIG. 1, symbols ■ and ■ shows the real part and the imaginary part of the permittivity at each Si concentration shown in Table 4. The closed symbol ■ means that an obtained extinction ratio is 15 dB or more and it has a Si concentration of 8.5 at % to 17 at %. The symbol ■ means that an obtained extinction ratio is 12.1 dB or more and it has a Si concentration of 26 at % to 45 at %.

The result shown in FIG. 1 and Table 4 proved that the Al—Si alloy according to this example satisfied the relationship of Expression (6) and a high extinction ratio of 15 dB or more was obtained.

Industrial Applicability

The polarization element according to the invention can be widely applied to optical apparatuses including liquid crystal projectors.

TABLE 4

| Si concentration (at %) | Permittivity (•: 630 nm) | | Shape of piece (height: 30 nm) | | Geometric area occupancy | Extinction ratio (dB) | (Absorption cross section)/ (irradiated area) |
| --- | --- | --- | --- | --- | --- | --- | --- |
| | Real part | Imaginary part | Long side (nm) | short side (nm) | | | |
| 8.5 | −49.7 | 18.8 | 200 | 30 | 0.43 | 18.3 | 14.5 |
| 17 | −40.5 | 16.5 | 175 | 30 | 0.43 | 16.2 | 11.1 |
| 26 | −34.2 | 14.7 | 155 | 30 | 0.42 | 14.3 | 9.0 |
| 36 | −26.7 | 13.4 | 135 | 30 | 0.41 | 12.1 | 6.3 |
| 45 | −20.3 | 9.75 | 115 | 40 | 0.45 | 11.5 | 5.7 |

The Al—Ag, Al—Au, and Al—Si alloys according to the invention have been described in detail above. The invention is not limited to the composition according to the above-mentioned examples. Therefore, any metal material may be used as long as the permittivity of metal forming the metal piece is in the range satisfying the relationship represented by Expression (6) and the same effect as described above is obtained.

DESCRIPTION OF REFERENCE NUMERALS AND SIGNS

31: SPECTRUM OF ABSORPTION COEFFICIENT WHEN DEPOLARIZATION FACTOR IS 0.065

32: SPECTRUM OF ABSORPTION COEFFICIENT WHEN DEPOLARIZATION FACTOR IS 0.108

33: SPECTRUM OF ABSORPTION COEFFICIENT WHEN DEPOLARIZATION FACTOR IS 0.1867
41: OPTICALLY TRANSPARENT SUBSTRATE
42: SURFACE OF SUBSTRATE 41
43: METAL PIECE WITH RECTANGULAR PARALLELEPIPED SHAPE
44: OPTICALLY TRANSPARENT DIELECTRIC FILM
101: REGION IN WHICH DEPOLARIZATION FACTOR IN LONG SIDE DIRECTION IS IN THE RANGE OF 0.01 TO 0.07
102: LINE INDICATING RELATIONSHIP BETWEEN LONG SIDE AND SHORT SIDE WHERE RATIO BETWEEN LONG SIDE AND SHORT SIDE IS 2.5
103: LINE INDICATING RELATIONSHIP WHERE RATIO BETWEEN LONG SIDE AND SHORT SIDE IS 3.5
104: LINE INDICATING RELATIONSHIP WHERE RATIO BETWEEN LONG SIDE AND SHORT SIDE IS 4.5
105: LINE INDICATING RELATIONSHIP BETWEEN LONG SIDE AND SHORT SIDE WHERE DEPOLARIZATION FACTOR IN LONG SIDE DIRECTION IS 0.03

The invention claimed is:

1. A polarization element comprising:
a substrate that transmits light with a predetermined wavelength;
a plurality of metal pieces, each having a length and a width on a plane, coplanar with a top surface of the substrate, and a height orthogonal to the top surface, arranged upon the top surface of the substrate such that no metal piece contacts another metal piece; and
a dielectric layer that contacts and coats each piece of the plurality of metal pieces, sandwiching them between the dielectric layer and the substrate,
wherein:
polarization characteristics of the polarization element change with a variation in plasmon resonance frequency of each piece of the plurality of metal pieces and a polarization direction of light irradiated onto each piece of the plurality of metal pieces:
the plasmon resonance frequency of each piece of the plurality of metal pieces in a predetermined direction is substantially equal to a frequency of light irradiated onto the polarization element; and
a real part ($\epsilon'$) and an imaginary part ($\epsilon''$) of a permittivity of a metal material comprises in each piece of the plurality of metal pieces at the plasmon resonance frequency, and the refractive index ($n_a$) of the dielectric layer have a relationship:

$$\{(\epsilon'-n_a^2)^2+\epsilon''^2\}\geq 80*n_a*\epsilon''.$$

2. The polarization element according to claim 1 wherein a total sum of geometric cross sections of all pieces of the plurality of metal pieces in the plane of the top surface of the substrate, which is substantially orthogonal to a propagation direction of the light irradiated onto the polarization element in a light radiation region is smaller than a geometric area of the light radiation region, and
a total sum of absorption cross sections of all pieces of the plurality of metal pieces at the plasmon resonance frequency is equal to or more than 10 times the geometric area of the light radiation region.

3. The polarization element according to claim 2, wherein each piece of the plurality of metal pieces piece has a shape of a substantially rectangular parallelepiped, and
a longest side, the length, of the substantially rectangular parallelepiped in an aggregate of pieces of the plurality of metal pieces is aligned substantially in a constant direction.

4. The polarization element according to claim 3, wherein the height of each piece of the plurality of metal pieces in a direction parallel to a propagation direction of the light irradiated is equal to or less than one-tenth of a wavelength of the light irradiated, and
dimensions of each piece of the plurality of metal pieces in a plane perpendicular to the propagation direction of the light irradiated are equal to or less than 1µm.

5. The polarization element according to claim 3,
wherein each piece of the plurality of metal pieces comprises Al or an Al alloy comprising Al and at least one selected from the group consisting of Si, Ag, and Au.

6. The polarization element according to claim 2,
wherein each piece of the plurality of metal pieces has substantially a shape of a cylindrical ellipse, and
a major axis of the ellipse is aligned substantially in a constant direction.

7. The polarization element according to claim 6,
wherein the height of each piece of the plurality of metal pieces in a direction parallel to a propagation direction of the light irradiated is equal to or less than one-tenth of a wavelength of the light irradiated, and
dimensions of the metal piece each piece of the plurality of metal pieces in a plane perpendicular to the propagation direction of the light irradiated are equal to or less than 1µm.

8. The polarization element according to claim 6,
wherein each piece of the plurality of metal pieces piece comprises Al or an Al alloy comprising Al and at least one selected from the group consisting of Si, Ag, and Au.

9. The polarization element according to claim 2,
wherein the height of each piece of the plurality of metal pieces in a direction parallel to a propagation direction of the light irradiated is equal to or less than one-tenth of a wavelength of the light indicated, and
dimensions of each piece of the plurality of metal pieces in a plane perpendicular to the propagation direction of the light irradiated are equal to or less than 1µm.

10. The polarization element according to claim 9,
wherein each piece of the plurality of metal pieces piece comprises Al or an Al alloy comprising Al and at least one selected from the group consisting of Si, Ag, and Au.

11. The polarization element according to claim 2,
wherein each piece of the plurality of metal pieces comprises Al or an Al alloy comprising Al and at least one selected from the group consisting of Si, Ag, and Au.

12. The polarization element according to claim 1,
wherein each piece of the plurality of metal pieces has a shape of a substantially rectangular parallelepiped, and
a longest side, the length, of the substantially rectangular parallelepiped in an aggregate of pieces of the plurality of metal pieces is aligned substantially in a constant direction.

13. The polarization element according to claim 12,
wherein the height of each piece of the plurality of metal pieces in a direction parallel to a propagation direction of the light irradiated is equal to or less than one-tenth of a wavelength of the light irradiated, and
dimensions of each piece of the plurality of metal pieces in a plane perpendicular to the propagation direction of the light irradiated are equal to or less than 1µm.

14. The polarization element according to claim 12,
wherein each piece of the plurality of metal pieces comprises Al or an Al alloy comprising Al and at least one selected from the group consisting of Si, Ag, and Au.

15. The polarization element according to claim 1,
wherein each piece of the plurality of metal pieces has substantially a shape of a cylindrical ellipse, and
a major axis of the ellipse is aligned substantially in a constant direction.

16. The polarization element according to claim 15,
wherein the height of each piece of the plurality, of metal pieces in a direction parallel to a propagation direction of the light irradiated is equal to or less than one-tenth of a wavelength of the light irradiated, and dimensions of each piece of the plurality of metal pieces in a plane perpendicular to the propagation direction of the light irradiated are equal to or less than 1μm.

17. The polarization element according to claim 15, wherein each piece of the plurality of metal pieces piece comprises Al or an Al alloy comprising Al and at least one selected from the group consisting of Si, Ag, and Au.

18. The polarization to claim 1, wherein
the height of each piece of the plurality of metal pieces in a direction parallel to a propagation direction of the light irradiated is equal to or less than one-tenth of a wavelength of the light irradiated, and
dimensions of each piece of the plurality anneal pieces in a plane perpendicular to the propagation direction of the light irradiated are equal to or less than 1μm.

19. The polarization element according to claim 18, wherein each piece of the plurality of metal pieces piece comprises Al or an Al alloy comprising Al and at least one selected from the group consisting of Si, Ag, and Au.

20. The polarization element according to claim 1, wherein each piece of the plurality of metal pieces piece comprises Al or an Al alloy comprising Al and at least one selected from the group consisting of Si, Ag, and Au.

* * * * *